United States Patent [19]

Kanazawa et al.

[11] Patent Number: 4,799,123
[45] Date of Patent: Jan. 17, 1989

[54] DISC CARTRIDGE

[75] Inventors: Yasunori Kanazawa, Hachioji; Haruo Arai, Mitsukaido; Tadahiro Kuwa, Ibaragi, all of Japan

[73] Assignee: Hitachi Maxell, Ltd., Osaka, Japan

[21] Appl. No.: 73,855

[22] Filed: Jul. 14, 1987

Related U.S. Application Data

[63] Continuation of Ser. No. 659,783, Oct. 11, 1984, abandoned.

[30] Foreign Application Priority Data

Oct. 14, 1983 [JP] Japan .................................. 59-192816

[51] Int. Cl.⁴ ...................... G11B 23/04; G11B 5/012
[52] U.S. Cl. ................................. 360/133; 360/99.12
[58] Field of Search ................ 360/71, 74.1, 85, 86, 360/97, 99, 132, 133; 242/198; 369/77.2, 258, 268, 270

[56] References Cited

U.S. PATENT DOCUMENTS

| | | | |
|---|---|---|---|
| 3,416,150 | 12/1968 | Lindberg | 360/133 X |
| 3,529,301 | 9/1970 | Hiruta | 360/133 |
| 4,060,840 | 11/1977 | Umeda | 360/85 |
| 4,399,480 | 8/1983 | Edwards | 360/133 X |
| 4,550,355 | 10/1985 | Larson et al. | 360/133 |

FOREIGN PATENT DOCUMENTS

| | | | |
|---|---|---|---|
| 58156269 | 3/1985 | Japan | 360/133 |
| 2103862 | 2/1983 | United Kingdom | 360/133 |

Primary Examiner—John H. Wolff
Attorney, Agent, or Firm—Birch, Stewart, Kolasch & Birch

[57] ABSTRACT

A disc cartridge having a case, a disc contained in the case, a shutter mechanism for opening and closing a head insertion window and drive shaft insertion hole and a disc clamping mechanism for clamping the disc when the disc is not in use, the disc clamping mechanism functionally entirely independent of the movement of the shutter mechanism.

13 Claims, 7 Drawing Sheets

Fig.10
Fig.11
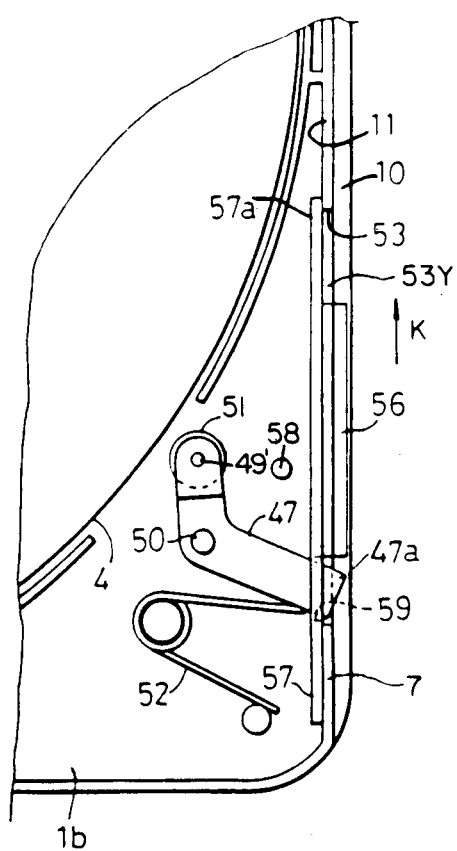
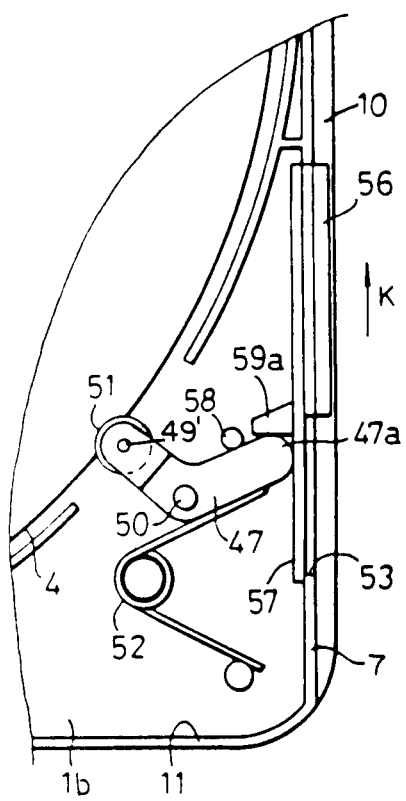

DISC CARTRIDGE

This application is a continuation of application Ser. No. 659,783, filed on Oct. 11, 1984, now abandoned.

BACKGROUND OF THE INVENTION

1. Field of the Invention

The present invention relates to a disc cartridge having a recording disc rotatably enclosed in a disc case.

2. Discussion of Related Art

In a disc cartridge of the type comprising an optical or magnetic recording medium made of a hard disc rotatably enclosed in a hard case of a generally rectangular shape, there is provided a clamp mechanism for preventing rotation of the recording disc when the disc cartridge is not in use. As shown in FIG. 1, the recording disc 4 is rotatably supported in the disc case 1 by rollers 45 and 46 which in turn are rotatably supported on fixed shafts projected on the bottom half 1b of the disc case 1 for rotatably engaging with the outer peripheral edge of the recording disc 4 and a pressing roller 51 rotatably supported on a bent clamp lever 47. The clamp lever 47 is swingably supported on a shaft 50 with the free end 47a of the arm situated in an operating opening 53 defined in part of the side wall 7. The clamp lever 47 is exerted by a spring member 52 so that the pressing roller 51 is biassed toward the rollers 45 and 46 thereby pressing the peripheral edge of the recording disc 4. A slide 56 is slidably provided along the side wall 7 so as to detachably engage with the free end 47a of the clamp lever 47. By this arrangement, when the disc cartridge is not in use, the clamp lever 47 is exerted toward the recording disc 4 by the spring member 52 for holding the recording disc 4 in a clamped manner by the rollers 45 and 46 and the pressing roller 51. On the contrary, when the disc cartridge is mounted on a disc drive apparatus, the slide 56 is moved in a backward direction of the disc case 1 along the side wall by an operating member of the disc drive apparatus whereby the free end 47a of the clamp lever 47 is pressed by the slide 56 so as to rotate the clamp lever 47 toward the side wall 7 for moving the pressing roller 51 to a releasing position away from the recording disc 4.

In the optical recording disc or magnetic recording disc of the vertical magnetization system in which the recording information is recorded at an extremely high density, since each of the recording spots on the disc is extremely small, if small particles of dust are collected on the disc, drop out of the signal or an error in reading the signal may occur. Therefore, dust must be prevented from entering the interior of the disc cartridge. However, according to the conventional disc cartridge having the clamp mechanism as described above, since the clamp lever 47 is adapted to be operated from outside of the disc case through the slide 56, the operating opening 53 is kept opened when the disc cartridge is not in use, therefore dust may easily enter the interior of the disc case 1.

SUMMARY OF THE INVENTION

An essential object of the present invention is to provide a disc cartridge in which the operating opening for the clamping lever can be effectively closed when the disc cartridge is not in use so that dust or foreign matter does not enter the interior of the disc case.

According to the present invention there is provided a disc cartridge which comprises a disc case (1), a disc (4) rotatably accommodated in the disc case (1), clamp means including a clamp member (47) movable between a clamp position for releasably clamping the disc (4) in a clamped state by engagement of a part of the clamp member (47) with the disc (4) and a release position for releasing the clamped state of the disc (4) by movement of the clamp member (47) away from the disc (4) and slide means (56) for operating the clamp means between the clamped position and the released position through one operating opening (53) defined on one of side walls (7) of the disc case (1), characterized by a closing means for closing the operating opening (53) at least when the clamp means is positioned in the clamping position.

BRIEF EXPLANATION OF THE DRAWINGS

FIG. 10 is a plan view showning another embodiment of a disc cartridge according to the present invention, and FIG. 11 is a plan view showing a further embodiment of a disc cartridge according to the present invention.

DETAILED DESCRIPTION OF THE PREFERRED EMBODIMENTS

Figure 1:
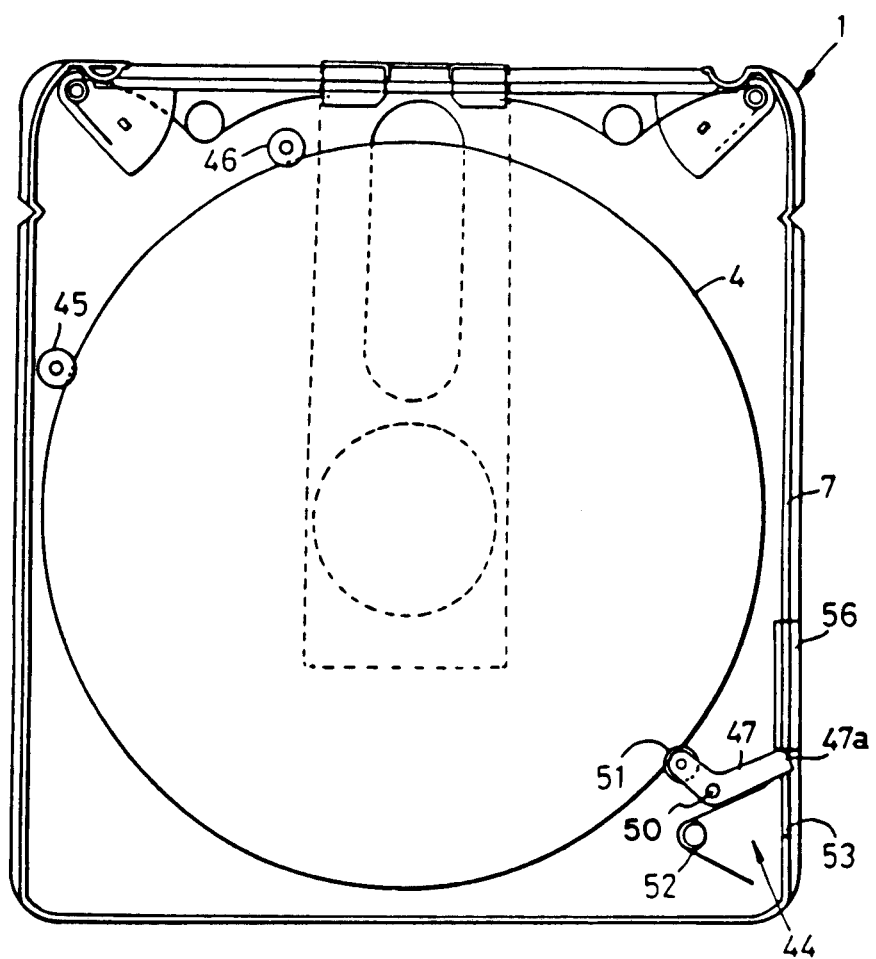
FIG. 1 is a plan view showing an essential portion of an interior of a disc cartridge.

Before the description proceeds, it is noted that like parts are designated by like reference numerals throughout the attached drawings.

Figure 2:
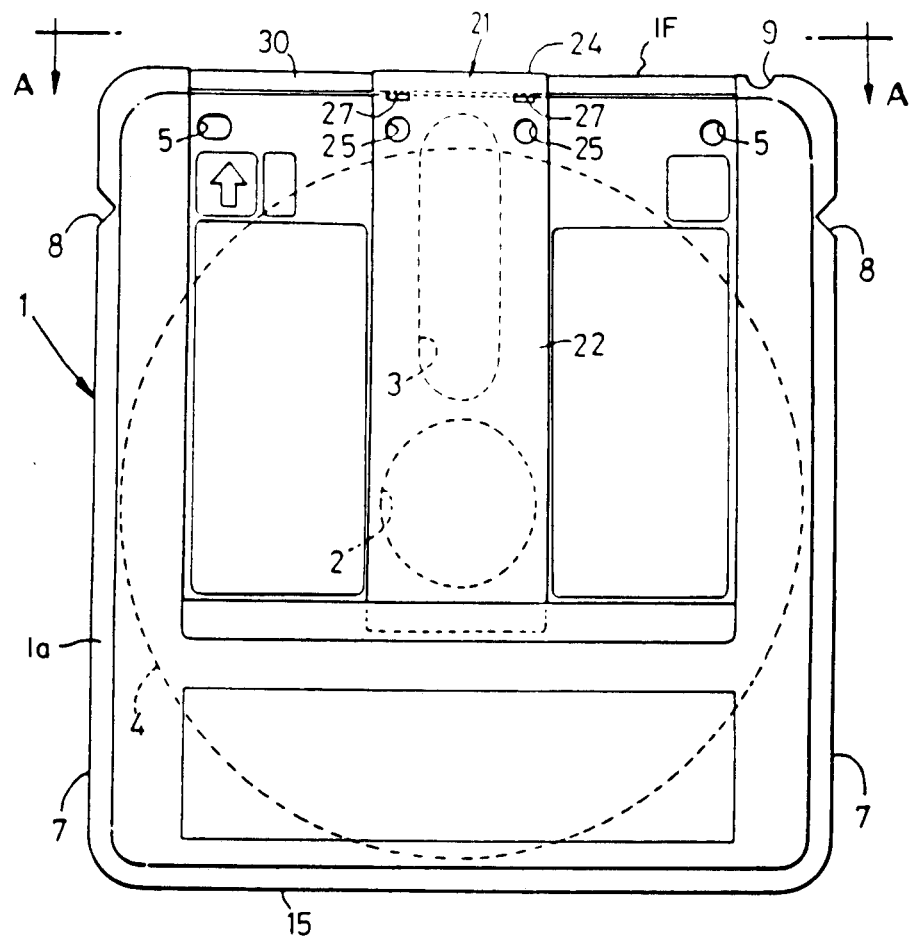
FIG. 2 is a plan view showing an outside of the disc cartridge according to the present invention.
Figure 3:
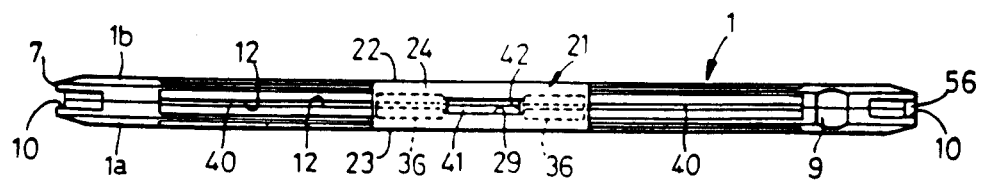
FIG. 3 is a front view seen in the direction of the arrow marks A of FIG. 2.

Referring to FIGS. 2 and 3, a disc case 1 is formed by combination of a top half 1a and a bottom half 1b. Both halves 1a and 1b are made of a plastic resin material and are assembled together in a butting manner by screws. Each of the halves 1a and 1b is provided with a drive shaft insertion hole 2 on the central portion and an elongated head insertion window 3 on the front half part of each of the halves 1a and 1b. A recording disc 4 is rotatably mounted in the disc case 1. The recording disc 4 may be an optical recording disc or a magnetic recording disc made of hard material.

By defining the drive shaft insertion holes 2 and the head insertion windows 3 on both sides of the disc case 1, the disc cartridge can be used for recording the information on both faces i.e., A face and B face of the recording disc 4.

In the front part of the disc case 1, a pair of standard holes 5 for receiving standard pins on the disc drive apparatus are defined at the laterally spaced symmetrical positions relative to the longitudinal center line. The standard holes 5 are defined on both halves 1a and 1b. A pair of generally V character shaped recesses 8 are defined on both lateral edge portions of the disc case 1 in a symmetrical manner. In order to identify the face and B face, an identification recess 9 in the form of a semi-spherical shape is defined on the right sided portion in the front face 1F of the disc case 1. Guide grooves 10 having a generally U shape are defined on outer parts of both side walls 7 of the disc case 1 extending in a longitudinal direction. It is noted that one of the standard holes 5 has a true circle shape and another standard hole has an elongated circular shape on each of the halves 1a and 1b and the true circle shaped standard hole on one of the halves is opposed to the elongated circular shaped standard hole on the other half with the center of both standard holes 5, coinciding when both halves are assembled together in the correct manner.

Figure 4:
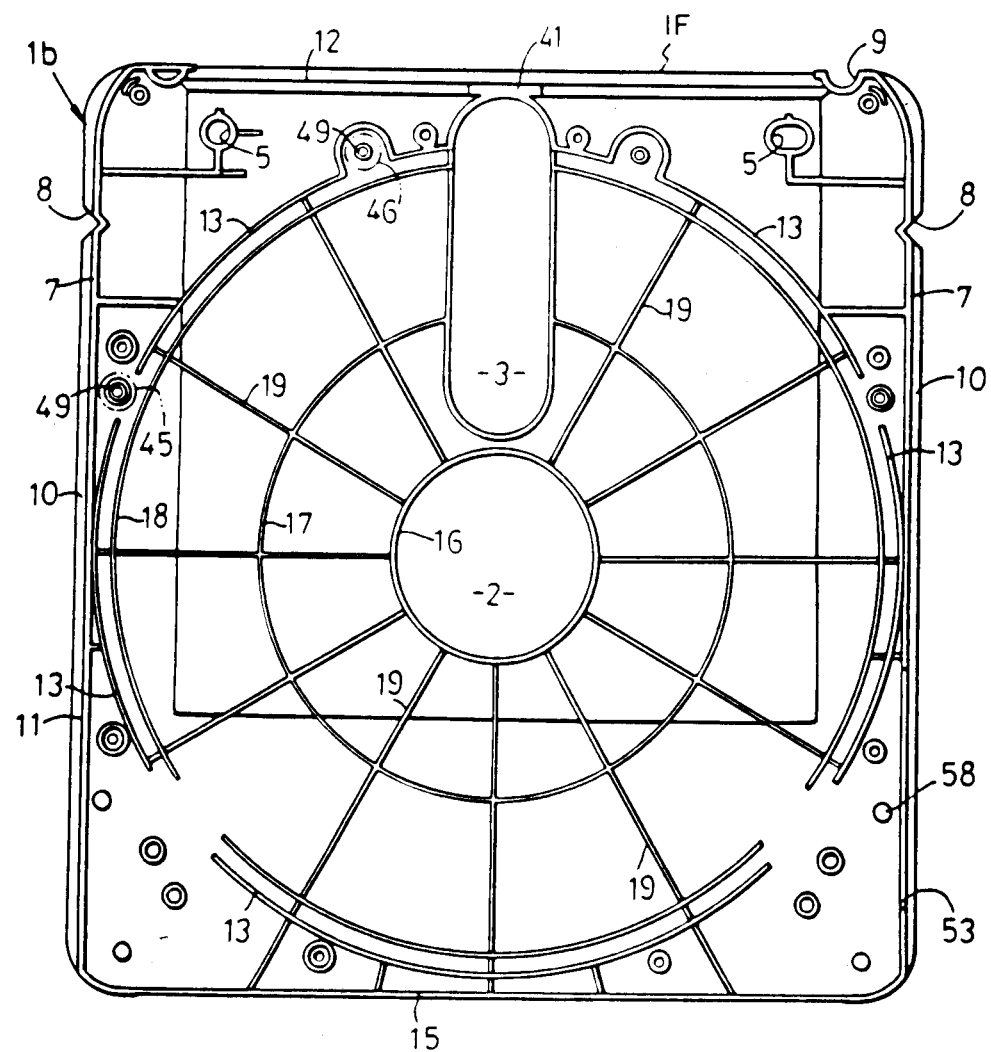
FIG. 4 is a plan view showing an interior of the a bottom case of the disc cartridge shown in FIG. 2.

FIG. 4 shows the interior of the bottom half 1b, wherein a peripheral wall 11 is projectingly formed so as to surround the peripheral edges of the bottom half 1b except for the front edge portion. The top half 1a is also provided with the peripheral wall in a similar manner as in wall 11 of the bottom half 1b so that the the top end portion of the peripheral wall 11 of the bottom half 1b can abut with the lower face of the peripheral wall of the top half 1b when both halves 1a and 1b are assembled together.

A guide rib 12 is formed extending laterally on the front portion of the bottom half 1b with the height lower than the height of the peripheral wall 11. Partition walls 13 are projectingly formed on the bottom half 1b in a generally annular shape having its center positioned at the center of the drive shaft insertion holes 2 with the height of the partition wall 13 coinciding with the height of the peripheral walls 11. The top half 1a is also provided with similar peripheral walls 11 and the partition walls 13 as formed on the bottom half 1a described above, so that when the top half 1a and bottom half 1b are assembled together, the left wall and right wall i.e., side walls 7 and the rear wall 15 of the disc case 1 can be formed by the peripheral walls 11 and the recording disc 4 can be accommodated in the chamber surrounded by the partition walls 13 of both halves 1a and 1b. On each of the inner faces of the halves 1a and 1b, there are projectingly formed annular ribs 16, 17 and 18 coaxially and inwardly of the partition walls 13 and a plurality of ribs 19 extending radially and intersecting with the annular ribs 16, 17 and 18, ending at the partition walls 13. The innermost annular rib 16 defining the outer wall of the drive shaft insertion hole 2 and the outermost rib 18 are formed slightly higher than the inner annular rib 17 and the radial ribs 19 so that the recording disc 4 can be slidably supported by the outermost rib 16 and innermost rib 18, thereby preventing the recording area of the recording disc 2 to be damaged by the inner annular rib 17 and the radial ribs 19.

Various members and openings on the left half and right half in the interior of the both halves 1a and 1b are arranged symmetrically with respect to a phantom line passing the respective centers of the drive shaft insertion hole 2 and the head insertion window 3 so that both halves 1a and 1b can be molded by the same mold. However, when both halves 1a and 1b are molded by the same mold, the identification recess 9 to be defined at the right end portion of the front edge portion of the bottom half 1b and an operating opening 53 to be defined at a right rear portion of the bottom half 1b of the disc case 1, as seen in FIG. 4, are defined at the laterally opposite positions on the top half 1a. Therefore, when molding the bottom half 1b, removable cores (not shown) are placed on the right half portion of the mold for defining the recess 9 and opening 53 on the right half portion of the bottom half 1b. To the contrary, when molding the top half 1a, the removable cores are placed on the left half portion of the mold for defining recess 9 and opening 53 on the left half portion of the top half 1a.

Figure 6:
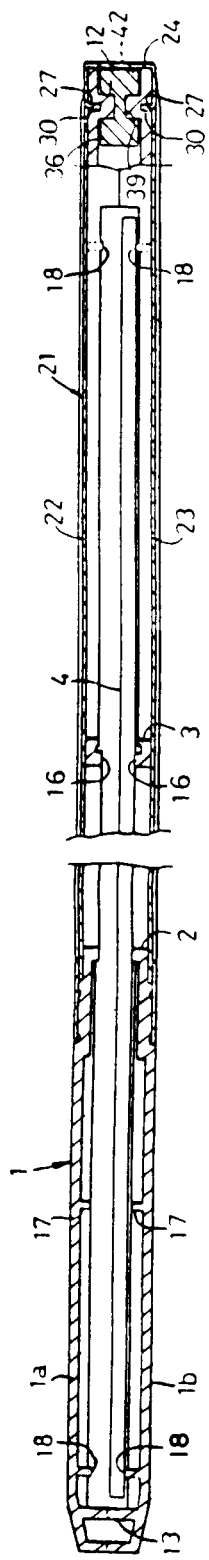
FIG. 6 is a cross sectional view taken along the lines B—B in FIG. 5.
Figure 7:
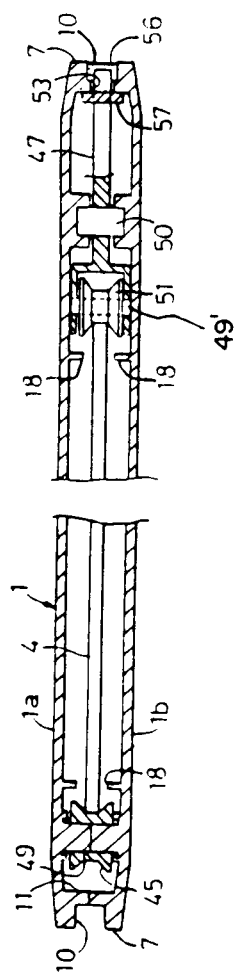
FIG. 7 is a cross sectional view taken along the lines C—C in FIG. 5.

An outer shutter 21 is mounted on the disc case 1 for closing the drive shaft insertion holes 2 and the head insertion windows 3 when the disc cartridge is not used. The outer shutter 21 is made of a thin metal plate bent in a generally U character shape, as shown in FIG. 6, having a pair of plates, top plate 22 and bottom plate 23, and a front plate 24 with a pair of pin insertion holes 25 defined on the right front portion of the plates 22 and 23 corresponding to the standard hole 5, as shown in FIG. 2. The outer shutter 21 is provided with a pair of engaging chips 27 inwardly raised by punching. An operating port 27 is defined on the central portion of the front plate 24, as shown in FIG. 3. The outer shutter 21 is mounted laterally slidably mounted on the disc case 1 from the front, so that the engaging chips 27 are movably fitted in guide slots 30 defined near the front edge portion of the disc case 1 in the lateral direction of the disc case 1, whereby the outer shutter 21 can be manually moved in the right or left directions along the guide slots 30 for opening or closing the drive shaft insertion holes 2 and the head insertion windows 3.

Figure 5:
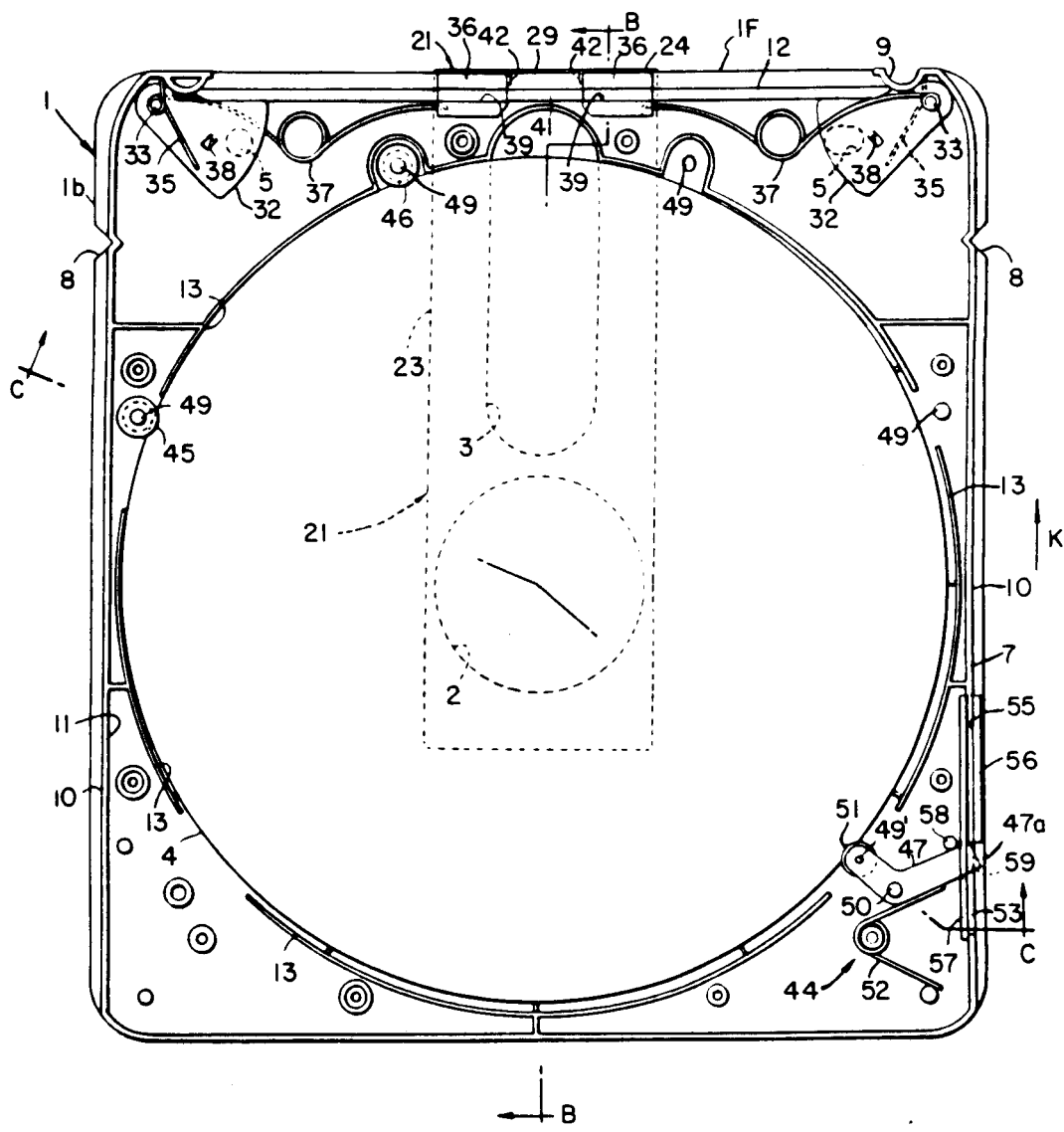
FIG. 5 is a plan view showing an arrangement of the inside of the disc cartridge according to the present invention.

A pair of inner shutters 32 are movably provided in the disc case 1 for opening and closing the standard holes 5. Each of the inner shutters 32 are formed of metal plate in a fan shape as shown in FIG. 5 and are rotatably supported by a supporting pin 33 on the front corners of the disc case 1. Each of the inner shutters 32 is exerted by a spring member 35 in the form of a twisted coil so as normally to close the standard hole 5. The rotation of the inner shutter 32 is limited by the guide rib 12. The outer shutter 21 and inner shutter 32 cooperate through sliding blocks 36 made of plastic resin material having good slidability, coupling springs 37 with its intermediate portion coiled and engaging members 38 formed on the central portion of the inner shutters 32 by punching. As shown in FIG. 6, each of the sliding blocks 36 has sliding slots 39 on the top and bottom faces and the sliding block 36 is slidably held by fitting the sliding slots 39 with the guide ribs 12 so as to move along the slit 40. The slit 40 is divided into a left portion and a right portion by a stopper wall 41 projected on the central portion of the guide rib 12 and the sliding blocks 36 can be moved laterally on both sides of the stopper wall 41. The coupling spring 37 serves as a return spring for the outer shutters 21 for exerting the outer shutters 21 toward its home position with one end of the spring 37 engaged with the supporting pin 33 and the other end engaged with the sliding block 36 so as normally to push the sliding block 36 towards the stopper wall 41. When the sliding blocks 36 abut onto the stopper walls 41, the operating chips 42 bent inwardly from the both lateral ends of the operating opening 29 of the front plate 24 of the outer shutter 21 engage with the inner faces of the sliding blocks 36.

Under such a state as described above, when the disc cartridge is not used, the top plate 22 and bottom plate 23 of the outer shutter 21 close the drive shaft insertion holes 2 and the head insertion windows 3. Also, the inner shutters 32 close the standard holes 5 by the force of the spring 35. When the disc cartridge is mounted on the disc drive apparatus for playing the A face, the drive member of the disc drive apparatus is fitted in the operating opening 29, thereby causing the outer shutter 21 to be moved in the right direction for example. Thus, the right side spring 37 can be deformed, so that the coupling spring 37 is engaged with the engaging chip 38 of the right inner shutter 32, causing the right inner shutter 32 to be rotated in a counter clockwise direction and the right standard hole 5 can be opened. By this operation the standard hole 5 is coaxially coincided with the pin receiving hole 25 of the outer shutter 21, thereby allowing entrance of the standard pin of the disc drive apparatus into the standard hole 5 and the pin receiving hole 25. After entrance of the standard pin in the pin receiving hole 25, the drive shaft of the disc drive apparatus can be engaged with the recording disc 4, then the recording head is allowed to enter in the head insertion window 3. This state can be maintained. When the disc cartridge is mounted on the disc drive apparatus for playing the B face, the outer shutter 21 is moved in the opposite direction with respect to the movement of the outer shutter in case of playing the A face and the left inner shutter can be opened in a similar manner as described above.

Figure 8:
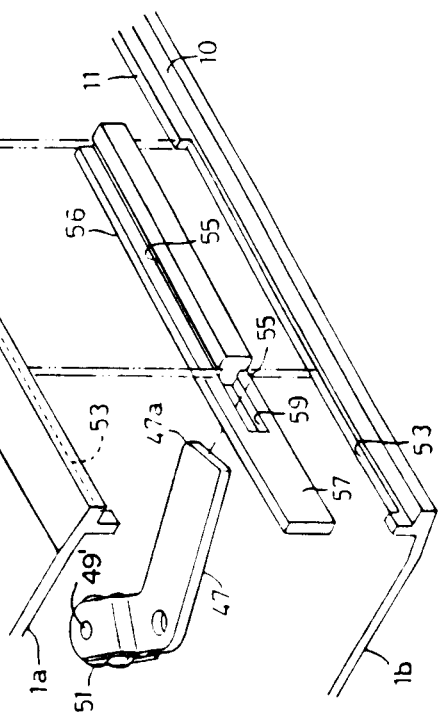
FIG. 8 is an exploded view of an essential portion of the clamp mechanism used in the disc cartridge according to the present invention.

A clamp mechanism 44 for preventing rotation of the recording disc 4 when the disc cartridge is not in use is shown in FIGS. 5 and 8. The clamp mechanism 44 is basically composed of the rollers 45 and 46 for rotatably supporting the peripheral edge of the recording disc 4 and the clamp member 47 for pushing the recording disc 4 toward the rollers 45 and 46.

More specifically, the rollers 45 and 46 are separatedly disposed on the line defined by the peripheral walls 13 on the left front corner side of the disc case 1 and rotatably supported by the pins 49 standing on the inner face of the bottom half 1b. The clamp member 47 is disposed on the right rear corner side of the disc case 1 opposite to the rollers 45 and 46. The clamp member 47 is formed in a bell crank shape and the intermediate portion thereof is pivoted by the shaft 50 with the inner end of the arm of the clamp member 47 provided with the pressing roller 51 which is pivoted by a pin 49'. The clamp member 47 is exerted by the coil spring 52 of a compression type for pressing the roller 51 onto the peripheral edge of the recording disc 4. The free end portion 47a of the clamp member 47 is situated at the operation opening 53 defined on the rear portion of the right side wall 7 of the bottom half 1b. The operating opening 53 is defined by lowering the height of a part of the peripheral walls 11 corresponding to the length of the movement of the free end 47a of the clamp member 47 between the clamp position and release position. A slide 56 having a generally H character shape is slidably mounted between the top half 1a and bottom half 1b by fitting the side walls 11 in a slot 55 of the slide 56, so that the slide 56 is situated opposing the guide slot 10 and can be moved in both front and rear directions. A shutter plate 57 is projected from the slide 56 in the rearward direction and an engaging hole 59 of an elongated rectangular shape is defined near the root portion from where the shutter plate is projected. The free end portion 47a of the clamp member 47 is adapted to be engaged in an engaging hole 59. When the disc cartridge is not in use, or in the normal state, the clamp member 47 is exerted in the frontward direction, as shown by an arrow mark k, by the spring member 52 and the slide 56 is moved up to such a position that the front end of the slide 56 is situated at the frontmost end of the operating opening 53. Even under this state, a part 53X of the operating opening 53 existing backward of the clamp member 47 is closed by the shutter plate 57 existing inside of the side wall 7 of the disc case 1, thereby preventing entrance of dust or foreign matter into the interior of the disc case. Under this state, the pressing roller 51 is pressed against the peripheral edge of the recording disc 4, the recording disc 4 can be clamped by the rollers 45, 46 and 51, whereby undesired displacement of the recording disc 4 can be prevented. Reference numeral 58 shows a stopper for limiting movement of the clamp member 47.

Figure 9:
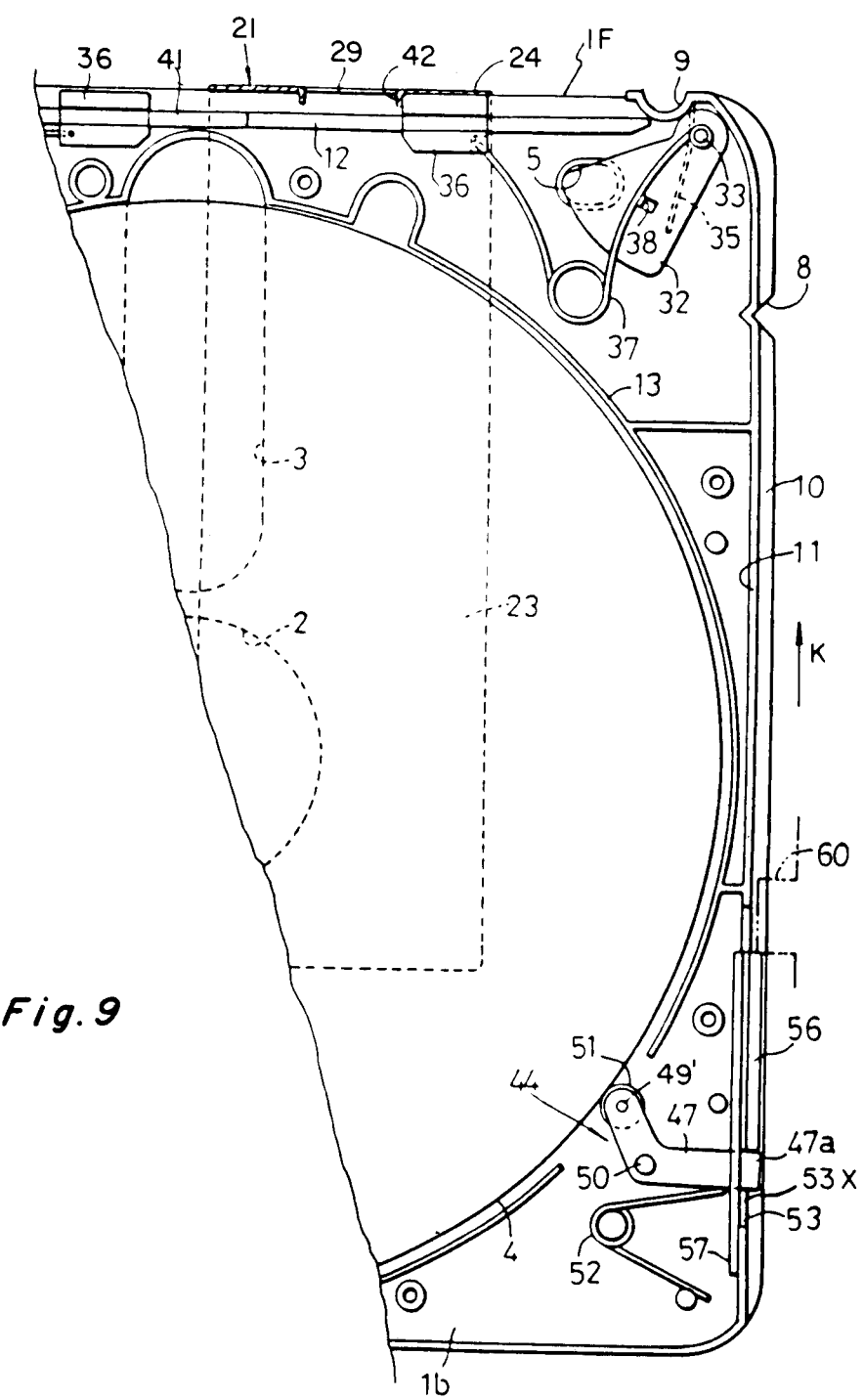
FIG. 9 is a partial plan view showing an operational state of the disc cartridge according to the present invention.

When the disc cartridge is mounted on the disc drive apparatus, as shown in FIG. 9, a pushing member 60 of the disc drive apparatus is entered in the guide slot 10 and engaged with the front end of the slide 56. Then by the relative movement of the disc cartridge and the pushing member 60 due to the insertion of the disc cartridge into the disc drive apparatus, the slide 56 is moved in the backward direction against the force of the spring member 52 and in turn the clamp member 47, the free end 47a of which is engaged with the rear end of the slide 56, is rotated in a clockwise direction, so that the recording disc 4 is released from the clamped state so that the recording disc 4 can rotate freely.

A modification of the arrangement of closing the operating opening is shown in FIG. 10, wherein an additional shutter plate 57a is projected frontwardly from the front end of the slide 56 so that a front part 53Y of the operating opening 53 can be closed by the additional shutter plate 57a when the disc cartridge is in use and the slide 56 is moved backward.

A further modification of the arrangement of closing the operating opening is shown in FIG. 11, wherein an engaging projection 59a is formed on the inner face of the shutter plate 57 so as to be projected in place of defining the engaging hole 59. The free end 47a of the clamp member 47 is terminated inside of the disc case 1 but is engageable with the engaging projection 59a. By this arrangement, when the slide 56 is moved backward, the engaging projection 59a is engaged with the free end 47a of the clamp member 47. In this arrangement, since no opening is defined in the shutter plate, it reliably prevents the entrance of dust or the like into the disc case 1.

Although the present invention is described with reference to the preferred embodiments, various modification can be made without departing the scope of the present invention. For example, in place of the rollers 45 and 46 one or more stationary frictional members may be used as the supporting members of the disc. Such frictional members can be formed integral with the disc case 1. Also the roller 46 of the clamp member 47 may be displaced in such a manner that one end of the clamp member is directly abutted onto the peripheral edge of the disc. Furthermore, a pair of clamp members may be disposed on the laterally symmetrical positions. Also, the shutter plate 57 and the additional shutter plate 57a may be formed separately from the slide 56, then both shutter plates 57 and 57a are pressed toward the slide 56 so as to close the operating opening 53. Furthermore, in place of the dual face type, a one sided disc cartridge may be used. In this case, it is sufficient to provide only one guide slot 10 on one of the side walls 7 on which the slide 56 is mounted.

What is claimed is:

1. A disc cartridge comprising:
   a disc case formed by the combination of a top half and a bottom half each provided with peripheral walls, a drive shaft insertion hole and a head insertion window, each half having a closed chamber formed in between said top and bottom halves by partition walls of said respective halves;

a disc rotatably accommodated in said chamber of said disc case;

a shutter mechanism for opening and closing said drive shaft insertion hole and said head insertion window;

clamping means for operatively clamping said disc when said disc is not in use, said clamping means including stationary clamping members and a movable clamping member movable between a clamped position for clamping said disc in a clamped state by engagement of a part of said movable clamping member, together with said stationary clamping members, against said disc and a released position for releasing said disc from the clamped state into a released state by disengagement of said movable clamping member from said disc; and a slide slidably movable along a peripheral wall of said case, coupled with said movable clamping member so that clamping of said disc by said respective clamping members is operated by sliding of said slide independently of said shutter mechanism.

2. The disc cartridge according to claim 1, wherein said slide has means for preventing said closed chamber from being exposed to the outside of said case irrespective of the position of said slide.

3. The disc cartridge according to claim 2, wherein said case has an operating opening formed in said peripheral wall in which opening said slide is movable, and said preventing means comprises a plate member attached to said slide for covering said opening irrespective of the position of said slide.

4. The disc cartridge according to claim 3, wherein said slide is movable between a first and a second position corresponding respectively to the clamped and released position of said movable clamping member.

5. The disc cartridge according to claim 1, wherein said stationary clamping members comprise a plurality of rollers and pins which pins are fixed to said case halves for rotatably supporting said rollers, and said movable clamping member has a roller rotatably supported by a pin which is fixed to said movable clamping member, so that a three point clamping of said disc is attained by said rollers.

6. The disc cartridge according to claim 1, wherein said movable clamping member of said clamping means comprises a bell crank shape with one end provided with said rotatable roller for clamping the periphery of said disc and the remaining end thereof coupled with said slide, said bell crank shaped member having a center supported by a support shaft.

7. The disc cartridge according to claim 1, wherein said movable clamping member is exerted toward the clamped position by a spring.

8. The disc cartridge according to claim 1, wherein an inner end of said movable clamping member is provided with a roller pressed to the peripheral edge of said disc during said clamped state and a free end of said movable clamping member is coupled with said slide.

9. The disc cartridge according to claim 8, wherein said slide is provided with a projection which projects inwardly of the disc case for engagement of said free end of said movable clamping member.

10. The disc cartridge of claim 1, wherein said disc cartridge further comprises a stopper for limiting the movement of said movable clamping member.

11. The disc cartridge according to claim 1, wherein said slide has a main body of generally an H character shape in cross section, said shape defining slotted portions, and a shutter plate for closing said operating opening coupled integrally with said main body which cooperate with respective portions of a top half and a bottom half of said disc case to permit lateral movement of said main body in said operating opening.

12. A disc cartridge which comprises:
a disc case with side walls provided with an operating opening in one of said walls thereof;
a disc rotatably accommodated in said disc case;
two fixed rollers for engagement with said disc;
a clamp member movable between a clamp position for clamping said disc in a clamped state by engagement of said clamp member to said disc and a release position for releasing said disc from the clamped state by removal of said clamp member away from said disc said clamp member together with said two fixed rollers providing a three point support for said disc when in said clamped state; and
a slide slidably mounted in said opening to move between one end and the other of said opening; said clamp member being connected to said slide so that said clamp member is positioned in the clamp and release positions when the slide is positioned at said one and other ends of said opening, respectively, said slide being provided with a closing member for closing said opening at least when said slide is positioned at said one end of said opening which corresponds to the clamp position of said clamp member.

13. The disc cartridge according to claim 12, wherein said slide has a main body with generally an H character shape cross section with two slots in which edge portions of side walls of top and bottom halves of said disc case constituting said opening are slidably mounted, and said closing member is integrally formed with said slide.

* * * * *